INVENTOR
ALEXANDER M. SENKEWICH
BY James M. Heilman
ATTORNEY.

May 26, 1970 A. M. SENKEWICH 3,514,643

THERMIONIC GENERATOR

Filed Feb. 20, 1968 3 Sheets-Sheet 2

INVENTOR
ALEXANDER M. SENKEWICH
BY James M. Heilman
ATTORNEY

INVENTOR
ALEXANDER M. SENKEWICH
BY James M. Heilman
ATTORNEY.

United States Patent Office 3,514,643
Patented May 26, 1970

3,514,643
THERMIONIC GENERATOR

Alexander M. Senkewich, New York, N.Y., assignor of seven and one-half percent each to Marjorie Kingston, Flushing, N.Y., and Linda Heilman, Rye, N.Y.

Filed Feb. 20, 1968, Ser. No. 706,851
Int. Cl. H01j 45/00
U.S. Cl. 310—4 11 Claims

ABSTRACT OF THE DISCLOSURE

This invention proposes a new design or new construction for an electrical energy source, i.e., the thermionic generator wherein the anode and the thermionic cathode function in a vacuum or a gas atmosphere in contact with sponge platinum, and the anode is the upper part of the metallic body of the generator.

This invention proposes a new design of an electrical energy source, the thermionic generator. The anode and the thermionic cathode, which function in a vacuum or a gas atmosphere, are the principal components of the proposed generator. The anode is the upper part of the metallic body of the generator.

Following types of cathode may be used:

(1) Cathode made from pure metal
(2) Multi-layer type cathode
(3) Thick-layer type cathode In the case of a thick-layer cathode, active material is deposited over a metallic substrate. The active material is the source of thermionic emission.

The proposed design, for example, utilizes the active material of third type (thick-layer). The thermionic cathode may be heated either directly or indirectly. The proposed design uses indirect heating, and the emitting surface is heated by an appropriate heater. The heating process is based on the following two properties of the sponge type platinum:

(1) The sponge platinum possesses the property of absorbing certain gases, particularly oxygen and hydrogen.

(2) The second property of the sponge platinum is that of a catalyzer with regard to oxygen. Oxygen in the presence of sponge platinum is capable of oxidizing various substances (hydrogen, sulphurous anhydride and many other organic substances) which do not combine with the sponge platinum under normal conditions. The hydrogen, when in contact with the sponge platinum ignites in the presence of air under normal temperature conditions. The heat given off from combustion of hydrogen is used to heat the cathode supporting the emission of electrons.

Referring to the figures, it will be seen that:

GENERATOR DESIGN

Figure 7:
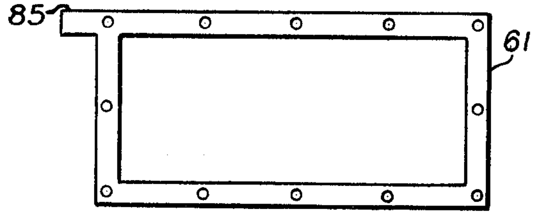
FIG. 7 is a top view of the anode.
Figure 8:
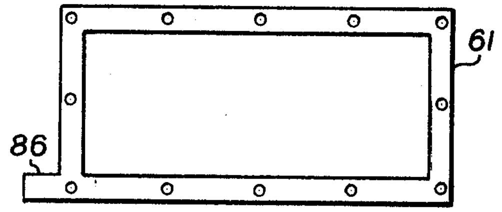
FIG. 8 is a top view of the cathode.
Figures 16, 18:
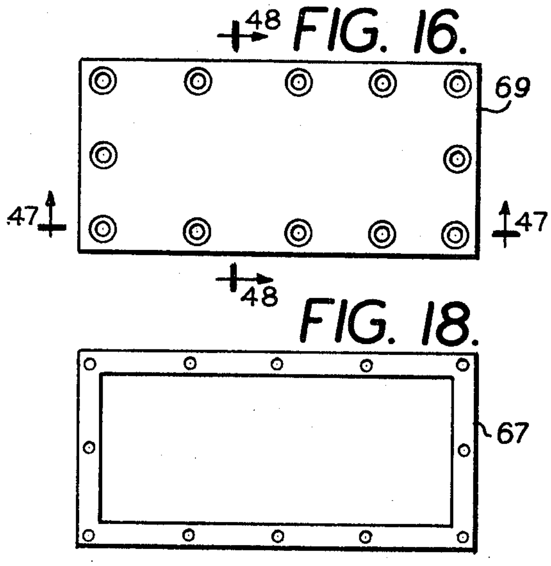
FIG. 16 is a top view of the same.
FIG. 18 is a top view of the insulation.

First the assembly is made of the main part of the generator (FIGS. 4, 5, 6) which consists of the anode 61 and cathode 62, which has a deposit of an active material (alkaline earth elements or others) 63. As it is shown in FIGS. 1, 3, 4, 6, the anode 61 is the upper portion of the metallic body of the generator. The anode possesses a somewhat elongated (FIG. 7) border 85 from one side which serves as the anode terminal. The lower portion of the main part of the generator is a metallic plate, the cathode 62, which has a deposit of the active material. The cathode also has (FIG. 8) one somewhat elongated border 86 which serves as the cathode terminal. Anode 61 and cathode 62 are fastened together sufficiently tight in order to preserve the required vacuum between the anode and the cathode. During the assembly, it is necessary to devote special attention to the electrical insulation. As seen from FIGS. 1, 3, 4 and 6, part of the bolts which connect anode 61 and cathode 62 have an insulating tubing 66. Insulation 67 (FIG. 18) is situated between the heads of the bolts 64 and the upper part of the anode. Insulation 68, having same shape, is also found along the edges, between the lower surface of anode 61 and the upper surface of cathode 62.

Figure 1:
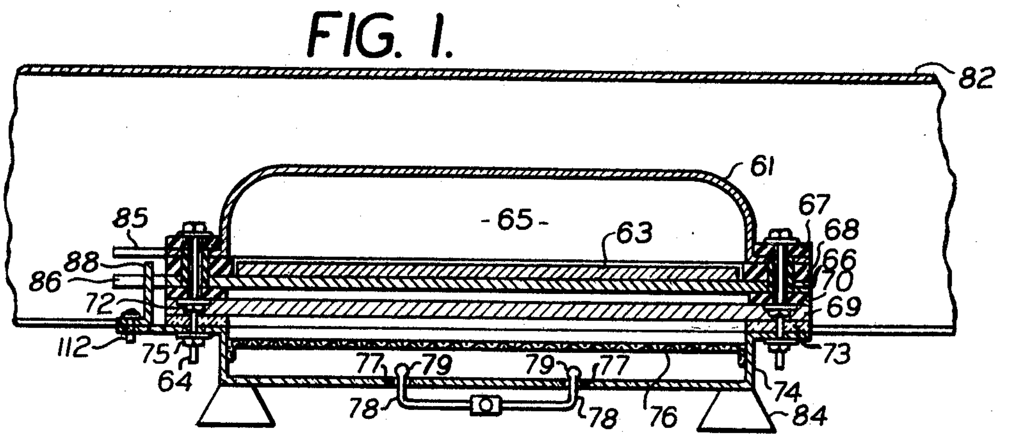
FIG. 1 is a front elevation view of the generator of the cross-section on line 38—38.
Figures 2, 3, 6:
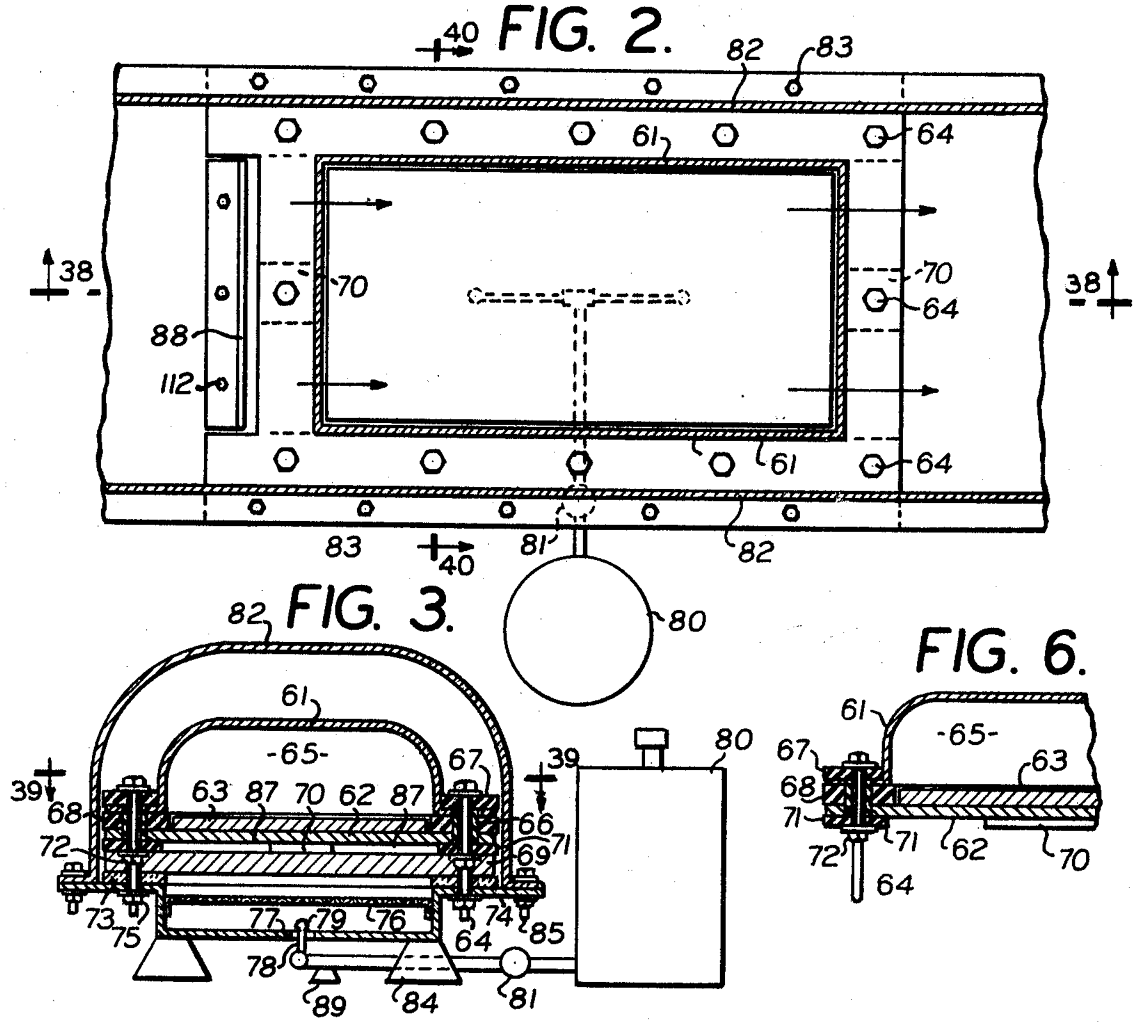
FIG. 2 is a top view of the same of the cross-section on the line 39—39 of FIG. 3.
FIG. 3 is a side view of the same. Cross-section on line 40—40.
FIG. 6 is a part side view of the same. Cross-section on line 42—42.
Figure 19:
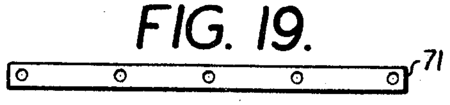
FIG. 19 is a top view of the ribbon insulation.
Figure 20:
FIG. 20 is a top view of the washer insulation.

Insulation of various shape is found between the lower surface of the cathode 62 and the upper surface of the sponge platinum 69 (FIGS. 1 and 3). The longitudinal insulation is in the form of a ribbon 71 (FIG. 19) and the transverse insulation is in the form of a washer 70 (FIG. 20). Thus there will be a spacing 87 between the washers 70. This spacing 87 will serve the exhaust purpose for the products of combustion of hydrogen through apertures on each side of washer 70 illustrated by solid lines in FIG. 3, and by dotted lines in FIG. 2. This spacing must be kept at a minimum in order to accomplish the best conditions for heat transfer to the cathode 62, during the burning of the hydrogen.

Figure 4:
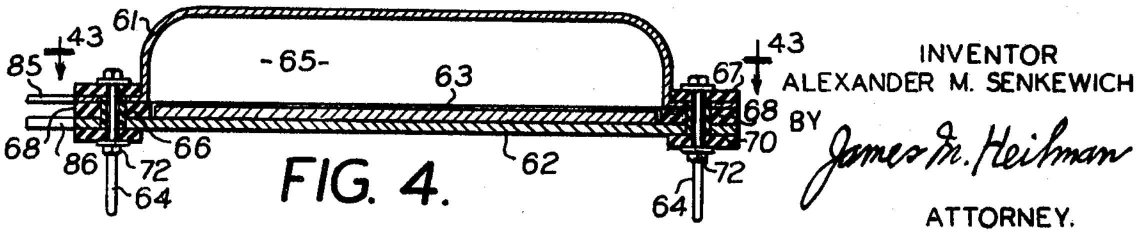
FIG. 4 is a front elevation view only of the assembled anode and cathode. Cross-section on line 41—41.
Figure 5:
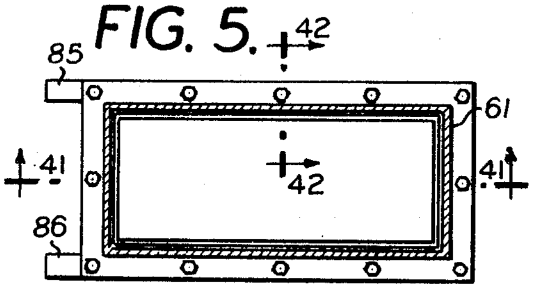
FIG. 5 is a top view of the same. Cross-section on line 43—43.
Figure 15:
FIG. 15 is a front elevation view of the sponge platinum plate. Cross-section on line 47—47.
Figures 9, 10, 11:
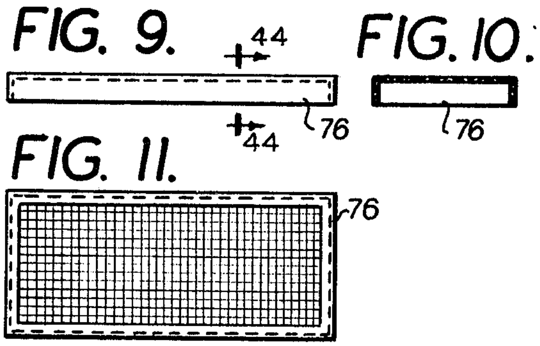
FIG. 9 is a front elevation view of the screen.
FIG. 10 is a side view of the same. Cross-section on line 44—44.
FIG. 11 is a top view of the same.
Figure 12:
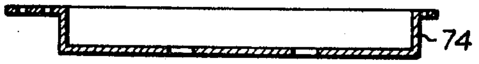
FIG. 12 is a front elevation of the collector box for the hydrogen. Cross-section on line 45—45.
Figures 13, 14:
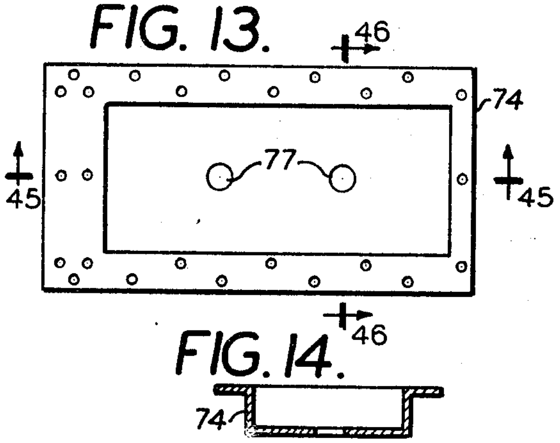
FIG. 13 is a top view of the same.
FIG. 14 is a side view of the same. Cross-section on line 46—46.
Figure 17:
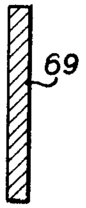
FIG. 17 is a side view of the same. Cross-section on line 48—48.
Figure 22:
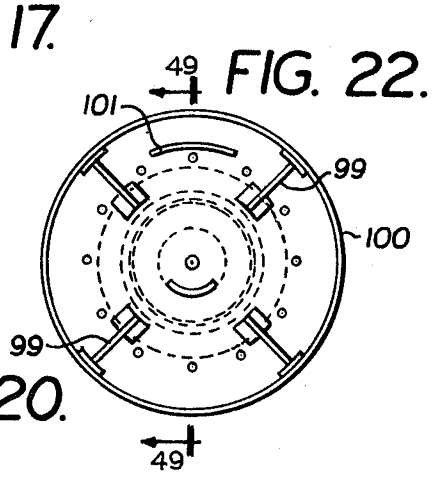
FIG. 22 is a side view of the same.

Damper plate 88 is fastened by bolts 112 to the front of the generator. The damper is used to block the air, which is fed to cool the generator, from forcing the heat out through the spacing 87. Now the entire collection of parts described above is fastened with nuts 72 and the working medium of the generator is completed (FIGS. 4, 5, and 6). Further assembly of the generator is conducted in the following order. The sponge platinum 69 is fitted from the bottom over the bolts 64 (FIGS. 15, 16, and 17) to allow bolts 72 to fit into the corresponding sockets (FIG. 15) of the upper surface of sponge platinum 69. Then the thermal insulation 73 and the collector box or chamber for the hydrogen 74 are fitted over the same bolts 64 (FIGS. 12, 13, 14). Everything is then tightened by the nuts 75. Screen 76 (FIGS. 9, 10, 11) is fastened to the side of the box from inside. At the bottom of box 74 there are two openings 77, same in number as the pipes 78 which feed the hydrogen. The openings 77 are somewhat larger than the diameter of the pipes 78 to allow the inflow of air. Screen 79 is at the end of pipes 78. Screens 76 and 79 are the safety screens.

The hydrogen is fed from tank 80 through the valve 81. Since the magnitude of the anode current depends to a large extent upon the degree to which the surface of the anode 61 is cooled, the outside surface is cooled by the passing air.

To acomplish this, the generator is covered by box 82, which is fastened by the longitudinal borders with bolts 83 to box 74. The air is thus fed into box 82 to cool the outside surface of the anode 61. The entire generator rests on supports 84. The pipes rest on supports 89.

I take for example hydrogen as a combustible. But another gas, containing hydrogen, can be used such as lighting gas, propane, etc. Alcohol, which contains hydrogen, can also be used, for example methyl alcohol, acetone, ether, etc. The hydrogen, which is fed under the lower surface of the sponge platinum, is absorbed by it. It is known that hydrogen when in contact with the sponge platinum ignites in the presence of air at ordinary temperatures. Therefore, in this case the hydrogen will ignite readily without the use of a spark or any other ignition source. The cathode, whose external surface is coated with an active material, will be heated by the burning hydrogen. An emission will result due to the thermal excitation of the electrons. The emitted electrons flow in the direction of the anode, bombard it and create an electric current of negative charge. The magnitude of the generator current depends mainly upon:

(1) The quality of the emitter and the active material.
(2) Emitter temperature.
(3) Area of the anode and the cathode.
(4) Degree of anode cooling.

During its operation, the magnitude of the output current may be regulated (valve 81) by the amount of feeding hydrogen.

SECOND TYPE

The main difference between the first type and the second type consists of the following: In the first type, the emitting surface of the cathode is heated at the expense of the heat generated by the burning hydrogen in the presence of the sponge platinum. This involves large heat loss. In the second type, the emitting surface becomes the outside surface of the electric heater. In this case, the useful thermal efficiency is significantly greater.

DESIGN OF THE GENERATOR OF SECOND TYPE

Figures 21, 23, 24, 25, 26, 27, 28, 29, 30, 31, 32, 33, 34, 35, 36, 37:
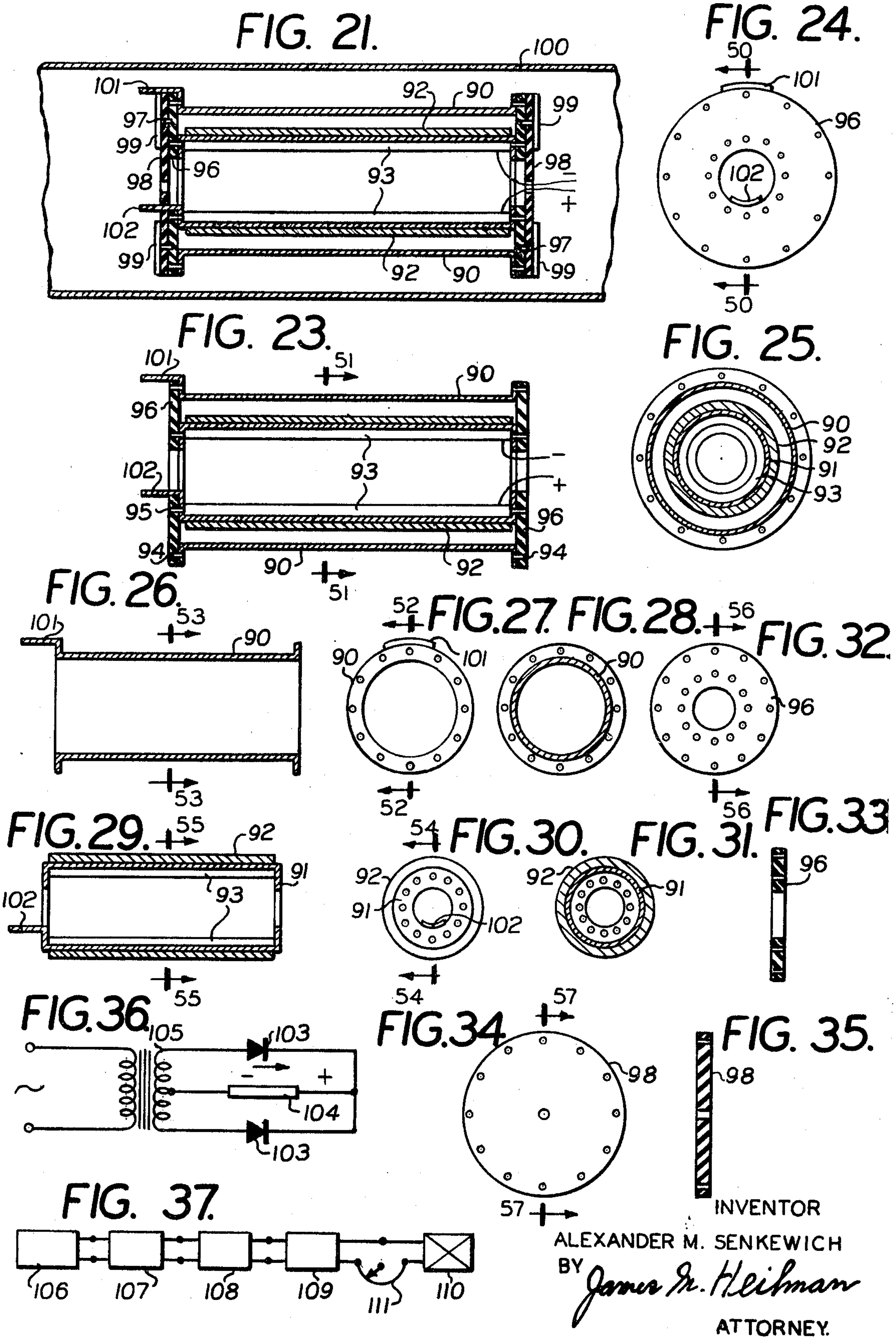
FIG. 21 is a front elevation view of the second type of the generator. Cross-section on line 49—49.
FIG. 23 is a front elevation view of the assembled anode and cathode only. Cross-section on line 50—50.
FIG. 24 is a side view of the same.
FIG. 25 is a side view of the same. Cross-section on line 51—51.
FIG. 26 is a front elevation view of the anode. Cross-section on line 52—52.
FIG. 27 is a side view of the same.
FIG. 28 is a side view of the same. Cross-section on line 53—53.
FIG. 29 is a front elevation view of the cathode. Cross-section on line 54—54.
FIG. 30 is a side view of the same.
FIG. 31 is a side view of the same. Cross-section on line 55—55.
FIG. 32 is a top view of the insulation disc.
FIG. 33 is a side view of the same. Cross-section on line 56—56.
FIG. 34 is a top view of the second disc insulation.
FIG. 35 is a side view of the same. Cross-section on line 57—57.
FIG. 36 is a scheme for using generator as rectifier.
FIG. 37 is a schematic connection generator with electromotor.

The form of the generator of this type, as an example, is taken as cylindrical. Anode 90 represents a metallic cylinder with flanges (FIGS. 26, 27, 28). Cathode 91 represents a hollow cylinder (FIGS. 29, 30, 31) also with flanges. On its outer surface, an active layer 92 is deposited, and inside there is an electrical heater 93. Anode 90 and cathode 91 are joined (FIG. 23) by leg screws 94, 95 to the insulating discs 96 (FIGS. 32, 33). This concludes the assembly of the main part of the generator in whose working medium a vacuum or gas atmosphere is formed. Then to the insulating discs 96, the discs 98 are fastened on both sides by means of leg screws 97 (FIGS. 34, 35). To these discs 98 are fastened rods 99 which support housing 100. Inside this housing 100, cool air passes for optimum cooling of anode surface 90. Anode 90 has terminal 101, and cathode 92 has terminal 102. The operation of the generator of this type is analogous to the operation of the first type mentioned above, except for the system of emitter heating.

AREA OF APPLICATION OF THE GENERATOR

The area of application of proposed thermionic generators are varied. For instance:

(1) The proposed generator can operate as a rectifier of intense currents due to the large flow of electrons. As seen from FIG. 36, the generator-rectifiers are connected in the full-wave rectification configuration where 103 are generator-rectifiers, 104 is the load, and 105 represents the transformer.

(2) The current, produced by the proposed generators, may be of sufficient magnitude to energize the electromotor of the electromobile.

The electromotor of the electromobile will operate directly from the generator current without the buffer batteries (FIG. 37) by regulation with rheostat or hydrogen valve. FIG. 37 shows schematically the connection of the generators 106, 107, 108 and 109 with the motors 110 through the rheostat 111. For improvement of the generator operation one can utilize:

(1) Schottky effect.

(2) Space charge due to emitted electrons may be neutralized by the introduction of ions. The anode and the cathode then will be coupled by the gas conductor—plasma.

What is claimed is:

1. A flat, substantially rectangular thermionic DC generator comprising an anode, a cathode and sponge platinum, each of these elements being flat and having substantial width and length to provide a large rectangular area, electrical insulation between each of said elements, a full gas collecting chamber, thermal insulation between said chamber and said sponge platinum, means to introduce combustible gas and outside air into said chamber whereby the gas will contact said sponge platinum after being mixed with air and will ignite and cause an emission of electrons from the cathode to the anode.

2. A thermionic generator as set forth in claim 1 wherein the combustible gas is taken from the group consisting of hydrogen, ignitable lighting gas, propane, alcohol, methyl alcohol, acetone, and ether.

3. A thermionic generator as set forth in claim 1 wherein the combustible gas is hydrogen.

4. A thermionic generator as set forth in claim 3 wherein a vacuum is provided between said anode and said cathode.

5. A thermionic generator as set forth in claim 4 wherein a mesh screen is provided in the gas collecting chamber and said cathode is thick and is coated with an alkali earth element.

6. A thermionic generator as set forth in claim 5 wherein a valve is provided to regulate the feed of the combustible gas fuel.

7. A thermionic generator as set forth in claim 6 wherein said collecting chamber is provided with a flange, and a housing is secured to said flange whereby air will pass within said housing and cool the anode.

8. A thermionic generator as set forth in claim 7 wherein the air passing over said anode will be heated and used.

9. A cylindrical thermionic energy convertor comprising a cylindrical anode and a cylindrical cathode coated with an alkali earth metal, electrical insulating discs at each end of said anode and cathode whereby to space said elements, spacing rods secured to said spaced apart insulating discs, a cylindrical housing secured to said spacing rods to surround said anode, and electrical heating means to cause ionization to occur and provide electrical energy.

10. A cylindrical thermionic energy convertor as set forth in claim 9, said generator may be used in a group and operate as a rectifier of an intense current.

11. A cylindrical thermionic energy convertor as set forth in claim 9 wherein a rheostat is provided in combination with the convertor, and the heat supplied to the cathode is regulated, whereby to operate the electromotor of an electromobile.

References Cited

UNITED STATES PATENTS 3,176,166 3/1965 Günther et al. -------- 310—4

DONOVAN F. DUGGAN, Primary Examiner